(12) United States Patent
Takahashi et al.

(10) Patent No.: US 11,115,198 B2
(45) Date of Patent: Sep. 7, 2021

(54) KEY GENERATION DEVICE, KEY GENERATION METHOD, AND COMPUTER PROGRAM PRODUCT

(71) Applicant: KABUSHIKI KAISHA TOSHIBA, Minato-ku (JP)

(72) Inventors: Ririka Takahashi, Setagaya (JP); Yoshimichi Tanizawa, Yokohama (JP); Kazuaki Doi, Kawasaki (JP); Mamiko Kujiraoka, Kawasaki (JP); Akira Murakami, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 285 days.

(21) Appl. No.: 16/289,066

(22) Filed: Feb. 28, 2019

(65) Prior Publication Data
US 2020/0092089 A1  Mar. 19, 2020

(30) Foreign Application Priority Data
Sep. 19, 2018 (JP) .............................. JP2018-174928

(51) Int. Cl.
*H04L 9/08* (2006.01)
*H04L 9/06* (2006.01)

(52) U.S. Cl.
CPC .......... *H04L 9/0852* (2013.01); *H04L 9/0643* (2013.01)

(58) Field of Classification Search
CPC . G06F 12/14; G06F 9/00; G06F 12/00; G06F 7/52; G06F 12/1408; H04L 9/08; (Continued)

(56) References Cited

U.S. PATENT DOCUMENTS 6,259,790 B1 * 7/2001 Takagi .................... H04L 9/302
380/28
7,451,288 B2 * 11/2008 Goettfert ............. G06F 12/1408
711/164
(Continued)

FOREIGN PATENT DOCUMENTS

| GB | 2503045 A | 12/2013 |
|---|---|---|
| JP | 2016-100693 A | 5/2016 |
| JP | 2017-168928 A | 9/2017 |

OTHER PUBLICATIONS

M. Lucamarini, et al., "Efficient decoy-state quantum key distribution with quantified security", Optics Express vol. 21,No. 21, 2013, 16 pages.

(Continued)

*Primary Examiner* — Thanhnga B Truong
(74) *Attorney, Agent, or Firm* — Oblon, McClelland, Maier & Neustadt, L.L.P.

(57) ABSTRACT

According to an embodiment, an information processor includes a memory and one or more hardware processors coupled to the memory. The one or more hardware processors are configured to function as a calculating unit, a determining unit, and a generating unit. The calculating unit is configured to calculate a key length. The determining unit is configured to determine a block size corresponding to a unit of processing in key generation and an outputtable size indicating the size of a key outputtable by the key generation. The generating unit is configured to generate a key having the key length by a hash operation using a matrix having a size determined by the block size and the outputtable size.

10 Claims, 6 Drawing Sheets

(58) Field of Classification Search
CPC ....... H04L 9/06; H04L 9/0852; H04L 9/0643; H04L 9/0858
See application file for complete search history.

(56) References Cited

U.S. PATENT DOCUMENTS

| | | | | |
|---|---|---|---|---|
| 7,984,018 | B2* | 7/2011 | Rodriguez | H04L 63/123 |
| | | | | 707/625 |
| 8,417,760 | B2* | 4/2013 | Fischer | G06F 7/722 |
| | | | | 708/620 |
| 2007/0274378 | A1* | 11/2007 | Warke | H04B 17/26 |
| | | | | 375/225 |
| 2015/0215122 | A1 | 7/2015 | Takahashi et al. | |

OTHER PUBLICATIONS

Fung, C.H. F., et al., "Practical issues in quantum-key-distribution post-processing", Department of Physics and Center of Theoretical and Computational Physics, arXiv: 0910.0312v2 [quant-ph], Dec. 29, 2009, 17 pages.

* cited by examiner

KEY GENERATION DEVICE, KEY GENERATION METHOD, AND COMPUTER PROGRAM PRODUCT

CROSS-REFERENCE TO RELATED APPLICATIONS

This application is based upon and claims the benefit of priority from Japanese Patent Application No. 2018-174928, filed on Sep. 19, 2018; the entire contents of which are incorporated herein by reference.

FIELD

Embodiments described herein relate generally to a key generation device, a key generation method, and a computer program product.

BACKGROUND

Conventionally known are quantum key distribution (QKD) techniques for securely sharing a cryptographic key between a transmitting device and a receiving device connected via an optical fiber using a single photon continuously transmitted therebetween. Conventional technologies are described in UK Patent No. 2503045 and Efficient decoy-state quantum key distribution with quantified security, M. Lucamarini et al., Optics Express, Vol. 21, Issue 21, pp. 24550-24565 (2013), for example.

However, it is difficult for the conventional techniques to increase the generation speed while maintaining the security of the key under a limited resource.

DETAILED DESCRIPTION

Figure 1:
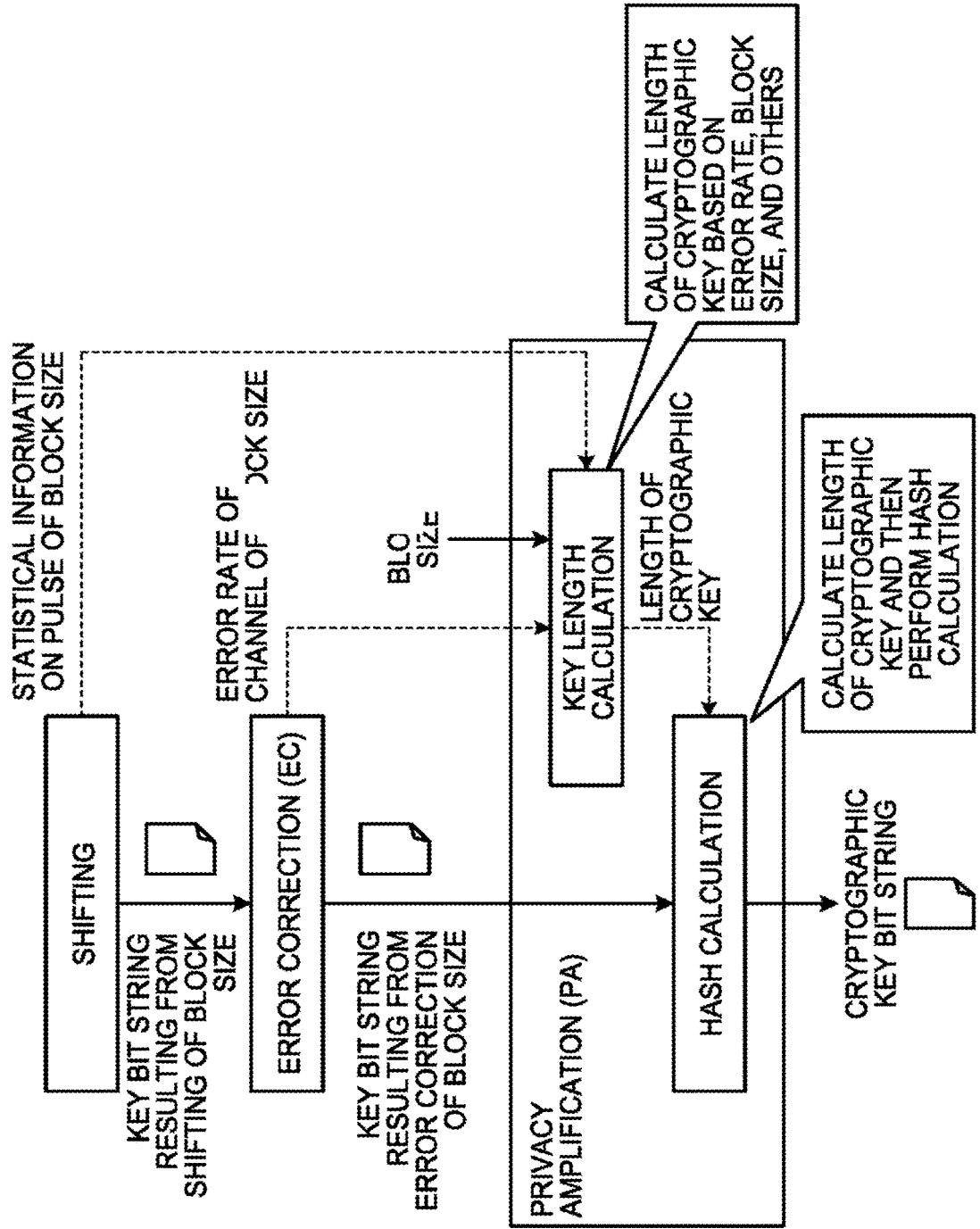
FIG. 1 is a flowchart of an example of key distillation.

According to an embodiment, an information processor includes a memory and one or more hardware processors coupled to the memory. The one or more hardware processors are configured to function as a calculating unit, a determining unit, and a generating unit. The calculating unit is configured to calculate a key length. The determining unit is configured to determine a block size corresponding to a unit of processing in key generation and an outputtable size indicating the size of a key outputtable by the key generation. The generating unit is configured to generate a key having the key length by a hash operation using a matrix having a size determined by the block size and the outputtable size.

Exemplary embodiments of a key generation device, a key generation method, and a computer program product are described below in greater detail with reference to the accompanying drawings.

Outline of QKD

A quantum cryptographic communication system is described first. The quantum cryptographic communication system includes a transmitter and a receiver. The transmitter transmits photons on an optical fiber link, and the receiver detects the transmitted photons. Subsequently, the transmitter and the receiver exchange control information, thereby sharing cryptographic key information therebetween. This processing is referred to as shifting. Subsequently, error correction (EC) is performed based on the shared cryptographic key information to correct an error in the cryptographic key information occurring between the transmitter and the receiver. In addition, privacy amplification (PA) is performed, which corresponds to information compression for deleting information that may possibly be eavesdropped by an eavesdropper from the cryptographic key information. With the processing described above, the transmitter and the receiver can finally share the cryptographic key guaranteed not having been eavesdropped.

The technique described above can be carried out by a technique generally called quantum key distribution (QKD). The shared cryptographic key is used to perform cryptographic communications of data between the transmitter and the receiver or between applications connected to the respective devices.

In QKD, a quantum used to share the cryptographic key has an uncertainty principle that its state changes by being observed, which is one of the basic principles of quantum mechanics. With this property, if an eavesdropper observes a quantum including the cryptographic key information transmitted by the transmitter on a quantum channel, the state of the quantum changes. As a result, the receiver that receives the quantum can find out that the quantum has been observed by the eavesdropper. At this time, the change in the quantum state appears as a quantum bit error rate (QBER) on the link between the transmitter and the receiver. If the eavesdropper tries to eavesdrop the quantum, the state of the quantum changes, and the QBER increases. As a result, the receiver and the transmitter can find out the presence of the eavesdropper.

Performance and Secure Key Rate

The number of shared cryptographic keys per unit time is called a secure key rate and corresponds to the operating speed performance of the quantum cryptographic system. A system capable of using a larger number of cryptographic keys can perform higher-speed and securer cryptographic communications. In other words, a QKD system with a higher secure key rate can provide higher performance.

Security and Finite Size Effect

In QKD, it is difficult to accurately determine the amount of information eavesdropped by an eavesdropper. Consequently, the QKD system may possibly estimate the amount of eavesdropped information and calculate the length of a secure cryptographic key based on the estimated value. To output a cryptographic key from which the amount of information leaked to the eavesdropper is removed, the QKD system estimates the amount of information leaked to the eavesdropper based on a measured value in QKD, such as the QBER, and calculates the length of the cryptographic key with its security ensured.

The measured value in QKD, such as the QBER, is caused to fluctuate not only by the presence of an eavesdropper but also by an environmental cause, such as temperature and an external cause to the fiber. The QKD system, however, fails to distinguish these differences. Typically, from the perspective of giving priority to security, the QKD system calculates the length of the cryptographic key considering that all the fluctuations in the measured value in QKD, including those due to the environmental cause, are due to the presence of an eavesdropper, that is, considering that the information has been leaked to the eavesdropper.

An ideal QKD system preferably determines the amount of information leaked to the eavesdropper based on all the measured values in QKD obtained during the operations of QKD, such as the cryptographic key generated from the QBER and the cryptographic key information in the process of generating the cryptographic key, and calculates the length of the cryptographic key without any error. It is impossible, however, to collect all the measured values in QKD, which actually has an infinite length, and determine the amount of information leaked to the eavesdropper. Consequently, an actual QKD system needs to collect the measured values in QKD having a finite length by dividing the measured values into blocks having a certain length, for example, and estimate the amount of information leaked to the eavesdropper within the range. To accurately estimate the amount of information leaked to the eavesdropper, it is preferable to suppress the fluctuations as much as possible by increasing the amount of collected measured values in QKD and reduce estimation errors as much as possible. In terms of the errors generated by estimation, from the perspective of giving priority to security, the actual QKD system employs the estimated value corresponding to a larger amount of information leaked to the eavesdropper and calculates the length of the cryptographic key. Consequently, the actual system estimates the amount of information leaked to the eavesdropper to be larger than the ideal system that determines the amount of information leaked to the eavesdropper from an infinite length. As a result, the calculated length of the cryptographic key is reduced. The reduction in the length of the cryptographic key caused by the gap between the ideal system and the actual system may be referred to as a finite size effect. To suppress the reduction in the length of the cryptographic key due to the finite size effect, it is preferable to increase the unit of processing in the QKD system as much as possible by expanding the range of collection of the measured values in QKD, for example. The unit of processing is referred to as a block size.

Steps of the PA

FIG. 1 is a flowchart of an example of key distillation. The key distillation includes shifting, EC, and PA.

In the shifting, the QKD system extracts a key bit string from a photon detected in quantum communications based on information on a pulse and a basis of the photon and creates statistical information data on the pulse used to calculate a key length.

In the EC, the QKD system uses the key bit string generated by the shifting as an input to perform EC on a bit string shared by a transmitter and a receiver. The QKD system calculates an error rate of a quantum channel from the number of erroneous bits and outputs a key bit string resulting from the EC.

In the PA, the QKD system calculates the final length of a cryptographic key based on the error rate of the quantum channel and the statistical information data on the pulse and prepares a matrix having a size corresponding to the key length. The QKD system calculates a hash of the matrix and the key bit string resulting from the EC.

Specifically, the PA is divided into two steps of a key length calculation step and a hash calculation step. In the key length calculation step, the QKD system calculates the final length of the cryptographic key based on the error rate of the quantum channel and the statistical information on the pulse. As the error rate of the quantum channel is higher, the QKD system estimates the amount of information leaked to an eavesdropper to be larger and makes the length of the cryptographic key smaller to make the cryptographic key securer. To estimate the amount of information leaked to the eavesdropper in calculation of the final length of the cryptographic key, the QKD system calculates the error rate of a combination of the pulse and the basis. The QKD system calculates the number of counts and the number of bit errors of a plurality of pieces of data from the statistical information on the pulse generated by the shifting. In the key length calculation step, the QKD system receives, from the EC, the error rate of the quantum channel and the number of bits transferring on a classical channel in the EC. The QKD system uses the error rate and the number of bits for parameter estimation and calculates the final length of the cryptographic key.

To reduce errors in estimation of the amount of information leaked to the eavesdropper as described in the paragraph above (security and finite size effect), the QKD system increases the length of the cryptographic key and the size (block size) of a data set subjected to the series of processing as much as possible. As the block size is larger, the estimation errors decreases, and the calculated length of the cryptographic key increases.

In the hash calculation step, the QKD system prepares a matrix having a size corresponding to the length of the cryptographic key calculated at the key length calculation step and the block size used in the key length calculation. The QKD system uses the matrix to perform a hash operation on the matrix and the key bit string of the block size output by the EC. The QKD system finally outputs a cryptographic key bit string having the length of the cryptographic key calculated at the key length calculation step. The hash calculation is to calculate the product of a matrix and a vector. If the QKD system simply performs the hash calculation, it requires a large memory.

Explanation of the Hash Calculation in the PA

The hash calculation performed in the PA is processing for removing the information leaked to the eavesdropper. The QKD system generates a final secure cryptographic key on the assumption that the fluctuations in the measured value in QKD, such as the error rate on the quantum channel, are due to the eavesdropper and that all the data transferring on the classical channel may be eavesdropped by the eavesdropper. In the processing, the QKD system multiplies an input bit string by a diagonal-constant matrix called a Toeplitz matrix in which elements are constant along each diagonal from left to right as a hash function, for example, thereby compressing the bit string into a secure range. At this time, the QKD system changes the length of the bit string of the cryptographic key to be finally output considering the security depending on the fluctuations in the measured value in QKD, such as the error rate on the quantum channel.

Figure 2:
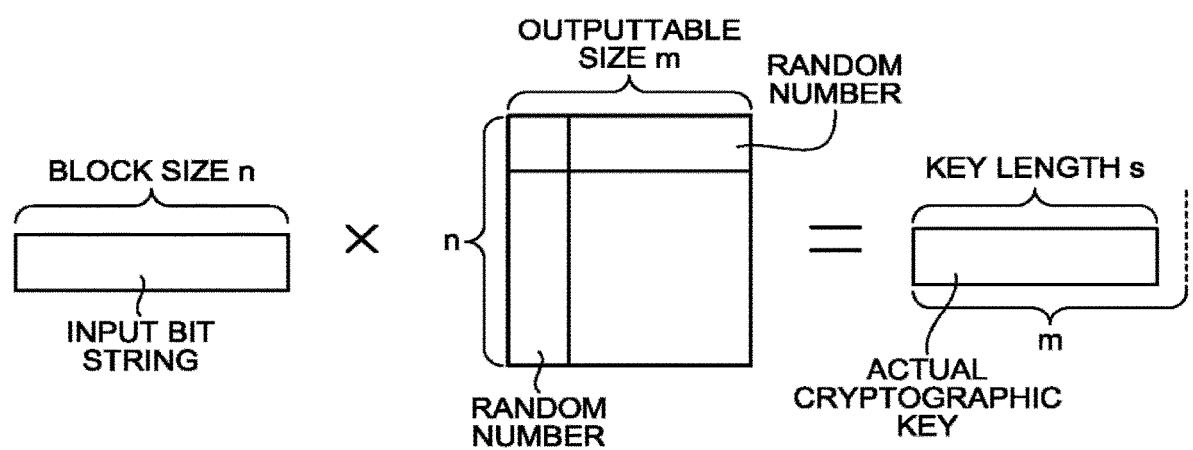
FIG. 2 is a diagram of the relation among a block size, an outputtable size, and a key length.

FIG. 2 is a diagram of the relation among a block size n, an outputtable size m, and a key length s. The following describes the procedure of the processing with reference to FIG. 2.

(1) Receive an input bit string of the block size n resulting from EC.

(2) Calculate the key length s of the cryptographic key based on the error rate of the quantum channel and other values.

(3) Obtain an n×s hash matrix using random numbers.

(4) Calculate the matrix product of the input bit string and the hash matrix and determine the output bit string having the key length s to be the cryptographic key.

In the PA, it is ideal to use the hash matrix having as large a size as possible from the perspective of the processing speed and the security (finite size effect). The size of the hash matrix used in the PA, however, is limited by a resource (size of a memory) allocated to the hash calculation.

As the size (block size n) of the bit string input in the PA becomes larger, the QKD system can efficiently generate the cryptographic key. The QKD system, however, has limitations in implementation, such as the memory size for hashing. The following describes a method for generating a cryptographic key considering the security and the high-speed performance under limitations in implementation.

Example of the Functional Configuration

Figure 3:
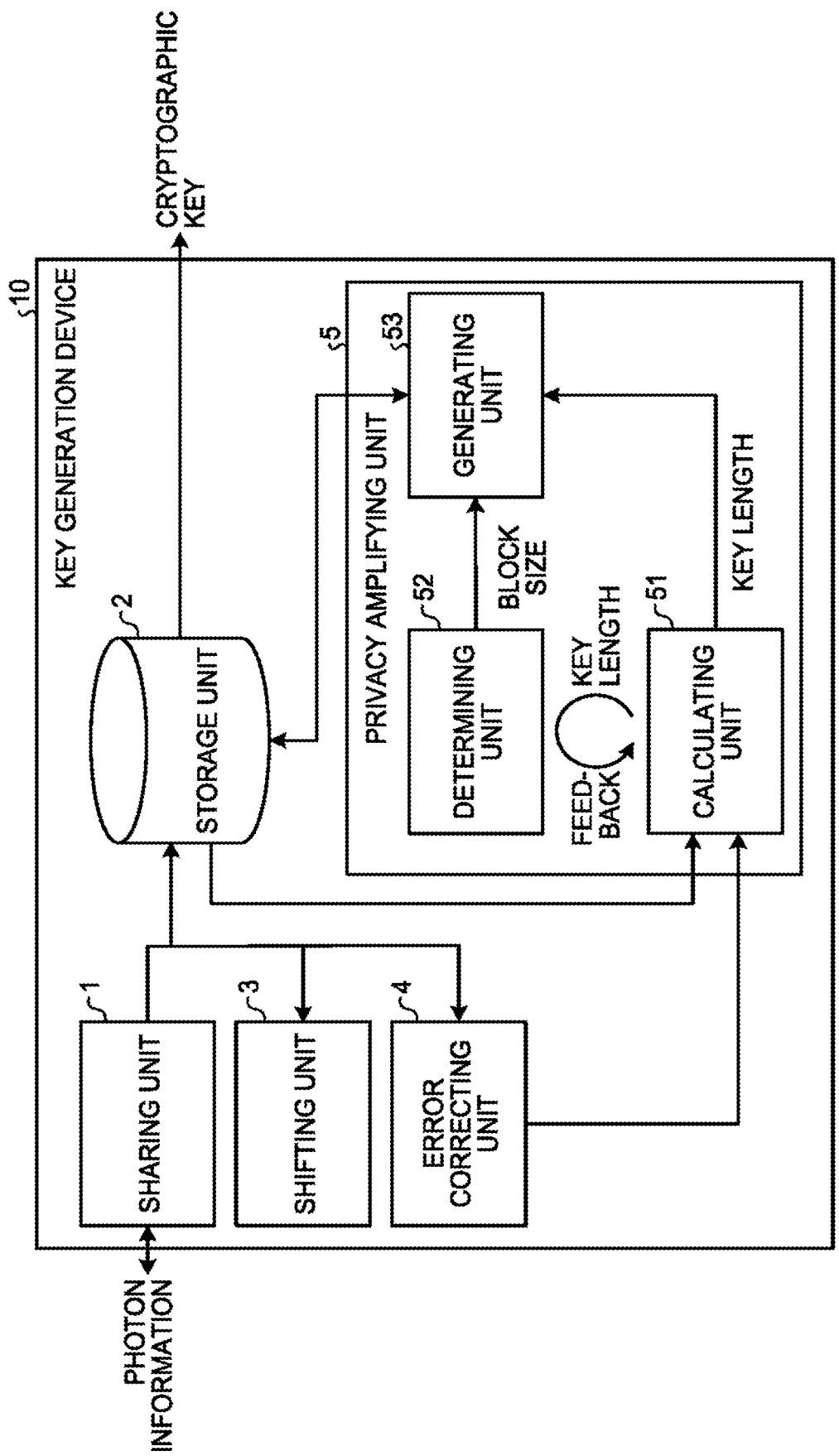
FIG. 3 is a diagram of an example of the functional configuration of a key generation device according to an embodiment.

FIG. 3 is a diagram of an example of the functional configuration of a key generation device 10 according to an embodiment. The key generation device 10 according to the embodiment includes a sharing unit 1, a storage unit 2, a shifting unit 3, an error correcting unit 4, and a privacy amplifying unit 5.

In the description of the embodiment, the key generation device 10 is included in a receiving device, for example.

The sharing unit 1 transmits and receives photon information to and from a transmitting device. The sharing unit 1 stores, in the storage unit 2, a quantum key bit string extracted from the photon information, information on a basis selected in extraction of the quantum key bit string, and information on a pulse used by the transmitting device to transmit the photon.

The storage unit 2 stores therein information. The storage unit 2, for example, stores therein information (e.g., the bit string) obtained by each functional block. The information stored in the storage unit 2 may be used by other configuration blocks via the storage unit 2 or directly transmitted and received between the configuration blocks.

The shifting unit 3 reads the quantum key bit string from the storage unit 2 and performs the shifting described above. The shifting unit 3 thus generates a shared key bit string shared with the transmitting device and stores it in the storage unit 2.

The error correcting unit 4 reads the shared key bit string from the storage unit 2 and performs the EC described above. The error correcting unit 4 thus corrects errors in the shared key bit string and stores the shared key bit string resulting from correction in the storage unit 2.

The privacy amplifying unit 5 reads the shared key bit string resulting from correction from the storage unit 2 and performs the PA described above. The privacy amplifying unit 5 thus generates a cryptographic key and stores it in the storage unit 2. The privacy amplifying unit 5 assumes that the communications performed with the transmitting device in the EC are leaked to an eavesdropper. In the PA, the privacy amplifying unit 5 generates the cryptographic key from the shared key bit string resulting from correction based on the amount of information that may possibly be eavesdropped. As the amount of information that may possibly be eavesdropped increases, the amount of information to be reduced in the PA increases.

Specifically, the privacy amplifying unit 5 includes a calculating unit 51, a determining unit 52, and a generating unit 53.

The calculating unit 51 calculates the key length of a cryptographic key. Specifically, the calculating unit 51 calculates the final length of the cryptographic key based on statistical information. The statistical information is an error rate received from the error correcting unit 4, for example. Alternatively/Additionally, the statistical information is statistical information (e.g., the number of counts and the number of errors) on a pulse (e.g., a decoy pulse and a vacuum pulse) received from the shifting unit 3, for example. Still alternatively/Additionally, the statistical information is the number of bits of data transferring via classical communications in the EC, for example.

The determining unit 52 determines the block size n corresponding to a unit of processing in key generation and the outputtable size m indicating the size of a key outputtable by the key generation. The block size n is determined based on an expression for calculating the key length of a cryptographic key, for example. The block size n is determined (updated) by expanding the block size n based on the fed-back key length, for example.

In the PA, it is ideal to use a hash matrix having a larger block size n (number of rows n) from the perspective of the processing speed and the security. However, if the block size n serving as an input increases, the outputtable size m is limited because of the limitation in the memory size for storing the hash matrix. Furthermore, the final size (key length s) of the cryptographic key serving as an output is also limited. To address this, the determining unit 52 determines the block size n corresponding to the key length s obtained by the key length calculation.

The following describes an example of specific procedures for determining the block size n.

Procedure/Derivation of the Optimum Value

The determining unit 52 determines the block size n based on at least one of the resource of the key generation device 10, the error rate of the quantum channel, and the statistical information on the pulse. Specifically, the determining unit 52 determines the block size n such that the key length s calculated by the key length calculation is equal to the outputtable size m, for example. By solving the equation of $f(n)=m$, for example, the determining unit 52 obtains the optimum n. The function f is an expression for the key length calculation and depends on the block size n. The function f includes a variable, such as the error rate of the channel (quantum channel). When a variable X is a constant indicating the upper limit of the sum of the number of rows and the number of columns of the hash matrix stored in the resource of the key generation device, the outputtable size m is calculated from the block size n and the resource X as follows: $m=X-n$. As a result, $f(n)=X-n$ is satisfied. In this case, $s=f(n)$ is also satisfied because the key length s is calculated from the expression for the key length calculation.

Procedure/Comparison

The determining unit 52 determines (updates) the block size n in each processing based on the positive/negative relation between the key length s calculated by the key length calculation and the outputtable size m. As described above, $m=X-n$ is satisfied. If $s>m$ is satisfied, the determining unit 52 makes the block size n smaller to make the outputtable size m larger. By contrast, If $s<m$ is satisfied, the determining unit 52 makes the block size n larger by reducing the outputtable size m.

Procedure/Reference to Histories

The determining unit 52 determines (updates) the block size n by collecting histories of the key length s calculated in the previous key length calculation. The determining unit 52 refers to an average s_avg of the previous histories of the key length s, for example, to determine the block size n to be $n=X-m$ such that the outputtable size m is larger than s_avg. Alternatively, the determining unit 52 refers to a maximum s_max of the previous histories of the key length s, for example, to determine the block size n such that the outputtable size m is larger than s_max.

Procedure/Monitoring

The determining unit 52 monitors the key length s calculated by the key length calculation and the outputtable size m obtained when the key length s is calculated at predetermined time intervals. The determining unit 52 thus determines (updates) the block size n to be an optimum value such that (the value of) the key length s approaches (the value of) the outputtable size m.

Procedure/Real-Time Control

The determining unit 52 searches for and uses the optimum block size n while comparing the result of the key length s calculated by the key length calculation and the outputtable size m in real time in the PA. Specifically, the determining unit 52 receives feedback of the key length s every time the key length s is calculated, for example. The determining unit 52 compares the fed-back key length s and the outputtable size m, thereby dynamically determining the block size n such that the outputtable size m is equal to the key length s. Alternatively, the determining unit 52 may receive feedback of the key length s at predetermined time intervals and compare the fed-back key length s and the outputtable size m, thereby determining the block size n such that the outputtable size m is equal to the key length s.

The block size n serving as a unit in the PA affects estimation errors occurring in estimation of the amount of information leaked to the eavesdropper from other statistical information. Consequently, the block size n may also be included in the statistical information described above.

The generating unit 53 generates a key having the key length calculated by the calculating unit 51 by a hash operation using a matrix having the size determined by the block size n and the outputtable size m. The generating unit 53, for example, generates a key having the key length calculated by the calculating unit 51 by a hash operation using a matrix (hash matrix) having the same number of rows as that of the block size n and the same number of columns as that of the outputtable size m. Specifically, the generating unit 53 extracts the shared key bit string resulting from correction stored in the storage unit 2 by the block size and performs the hash calculation using the hash matrix having the block size and the outputtable size shared by the transmitting device. The key bit string resulting from hashing may be output as a cryptographic key or may be stored in the storage unit 2 and then output as a cryptographic key.

Alternatively, the generating unit 53 may generate a key having the key length calculated by the calculating unit 51 by a hash operation using a matrix having the same number of columns as that of the block size n and the same number of rows as that of the outputtable size m.

Example of the Operating Method

As illustrated in FIG. 1, the PA is processing of receiving an input from the EC in the preceding stage and calculating a cryptographic key. In the EC, the key generation device 10 corrects errors in the key bit string received from the shifting, which is the preceding processing, and inputs the key bit string resulting from correction to the PA. In the EC, the key generation device 10 calculates an error rate from the errors included in the key bit string and inputs the error rate to the PA as the error rate of the quantum channel that performs QKD.

The processing in the PA is divided into the key length calculation and the hash calculation.

In the key length calculation in the PA, the calculating unit 51 calculates the final length of the cryptographic key based on the error rate of the quantum channel calculated in the EC, the parameter of QKD (e.g., the statistical information on the pulse), and the size (block size) of the key bit string subjected to the processing. To estimate the amount of information leaked to the eavesdropper and calculate the final length of the cryptographic key, the calculating unit 51 may possibly calculate the error rate using the combination of the pulse and the basis. For the calculation, the calculating unit 51 calculates the number of counts and the number of bit errors of a plurality of pieces of data from the statistical information on the pulse generated by the shifting. In addition, the calculating unit 51 receives, from the EC, the error rate of the quantum channel and the number of bits leaked in the EC (the number of bits transferring on the classical channel). The calculating unit 51 uses the number of counts and the number of bit errors of the pieces of data, the error rate of the quantum channel, and the number of bits leaked in the EC for parameter estimation and calculates the key length s corresponding to the final length of the cryptographic key.

On the assumption that the amount of information leaked to the eavesdropper is larger as the error rate of the quantum channel is higher, the calculating unit 51 removes the amount of information leaked to the eavesdropper and makes the key length s smaller to make the key securer. By contrast, on the assumption that the amount of information leaked to the eavesdropper is smaller as the error rate of the quantum channel is lower, the calculating unit 51 makes the key length s larger.

The accuracy in estimation of the amount of information leaked to the eavesdropper changes depending on the block size n. Consequently, the block size n affects the key length s corresponding to the final length of the cryptographic key.

If the block size n is larger, the estimation errors in the amount of information leaked to the eavesdropper estimated from the parameter of QKD decreases, and the key length s increases. If the block size n is smaller, the estimation errors in the amount of information leaked to the eavesdropper estimated from the parameter of QKD increases, and the key length s decreases. Typically, from the perspective of giving priority to security in the evaluation of security, the key generation device 10 assumes the amount of actually eavesdropped information to be the worst of the estimated values of the amount of information leaked to the eavesdropper. Consequently, the key generation device 10 determines the largest value of the estimated values to be the amount of information leaked to the eavesdropper. Reducing the estimation errors leads to lowering the upper limit in estimation of the amount of leaked information. As a result, the key generation device 10 can perform estimation closer to an actual value. Consequently, the key generation device 10 is prevented from estimating the amount of eavesdropped information to be a value unnecessarily larger than the actual value and making the final length of the key smaller.

In the hash calculation in the PA, the key generation device 10 prepares a matrix having a size corresponding to the length of the cryptographic key calculated in the key length calculation. The key generation device 10 calculates the matrix product of the matrix and the key bit string of the block size output in the EC and outputs the final cryptographic key bit string. In the PA, the key generation device 10 uses a special diagonal-constant matrix called a Toeplitz matrix as the hash matrix, for example. In the hash calculation, the sum of the number of rows and the number of columns is limited by the memory size. The number of rows is equal to the input block size and preferably as large a number as possible from the perspective of security. The number of columns is equal to the size of the cryptographic key bit string to be output and preferably as large a number as possible from the perspective of high-speed performance.

In the hash function used in the hash calculation, the block size n and the outputtable size m correspond to the number of rows and the number of columns, respectively, of the matrix as illustrated in FIG. 2. From the perspective of security, it is ideal that the block size n is made infinitely large. It is also ideal that the outputtable size m is made as large a size as possible, thereby outputting the cryptographic key having the key length s finally calculated in the key length calculation without any change as much as possible. The size of the hash matrix, however, has the limitation X due to the resource of the key generation device. As a result, the number of rows and the number of columns of the matrix have a trade-off relation, making it difficult to increase both of the values simultaneously.

In the key length calculation, the key length s is determined considering the security based on a variation, such as the error rate of the quantum channel, and the block size n. Even if the outputtable size m is made larger, the key generation device 10 can only output the key length s calculated in the key length calculation considering the security. As a result, the key length s may possibly be smaller than the outputtable size m. To address this, the determining unit 52 determines the block size n such that the key length s calculated in the key length calculation is equal to the outputtable size m. Consequently, the key generation device 10 effectively uses the resource of the key generation device and increases the processing speed while maintaining the security.

Relation Between the Memory Size and the Hash Calculation Size

In the hash calculation using the hash matrix, the upper limit of the available processing size is fixed depending on the memory size for storing the hash matrix. To perform a hash calculation using a Toeplitz matrix at high speed using number theoretical transform (NTT), for example, a memory required for performing NTT increases depending on the processing size corresponding to the sum of the number of rows and the number of columns of the hash.

Specifically, to perform a hash calculation having as large a length as possible, if not a hash calculation performed on the bit string resulting from the EC using the measured value in QKD having an infinite length, the size of the memory for storing the hash matrix serves as the limitation.

Relation Between the Size of the Hash Matrix and the Output Size in the PA

If a Toeplitz matrix is used in the PA, for example, the sum of the number of rows and the number of columns is limited by the memory size. The number of rows is equal to the size of the input bit string (block size n) and preferably infinitely large from the perspective of the security and the processing speed. The number of columns is equal to the length of the cryptographic key to be output and preferably large from the perspective of high-speed performance.

As described above, in the hash calculation using the Toeplitz matrix, the configuration of the hash function is limited by the memory size for storing the hash matrix. The characteristic limitation of the hash function is that the block size n corresponding to the number of rows of the hash matrix and the outputtable size m corresponding to the number of columns have a trade-off relation, for example. In other words, the following relation is satisfied: (Block Size n)+(Outputtable Size m)≤(Processing Size of Hash Function (Sum of Number of Rows and Number of Columns)). As described above, it is ideal that the block size n is infinitely large from the perspective of the security and the processing speed. The outputtable size m needs to be sufficiently large to cover the length s of the cryptographic key calculated in the key length calculation. The length s of the cryptographic key is determined considering the security based on the variation, such as the error rate, and the block size n and preferably as large a length as possible from the perspective of the processing speed. However, if the outputtable size m is made larger, the key length s may possibly be smaller than it.

Figure 4:
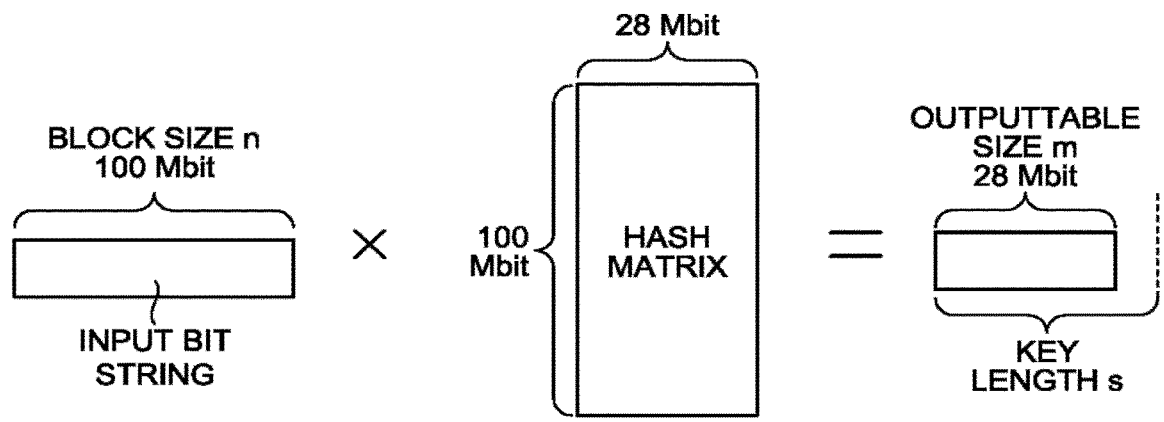
FIG. 4 is a diagram of a first example of the block size and the outputtable size according to the embodiment.
Figure 5:
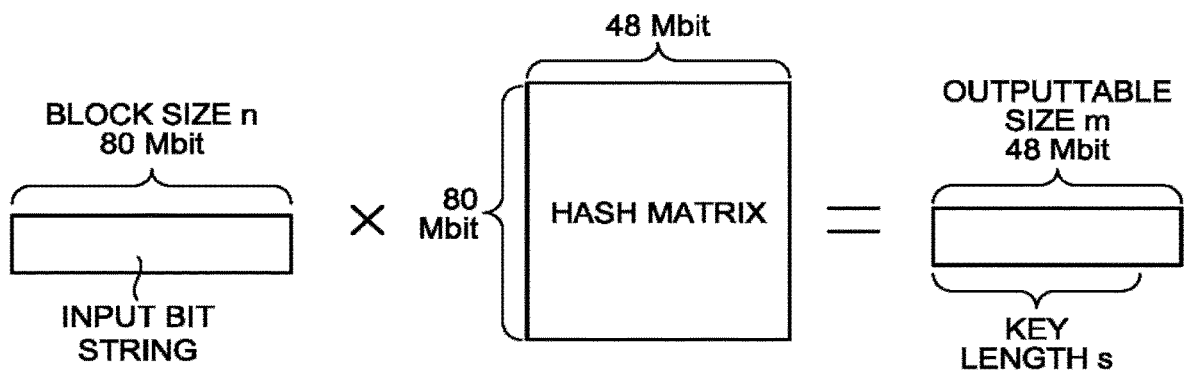
FIG. 5 is a diagram of a second example of the block size and the outputtable size according to the embodiment.

Specifically, the relation between the block size n and the outputtable size m is illustrated in FIGS. 4 and 5, for example.

FIG. 4 is a diagram of a first example of the block size and the outputtable size according to the embodiment. If the block size n increases to 100 Mbit, for example, the processing size of the hash matrix is determined by the limitation of the memory, and the outputtable size m has to decrease to 28 Mbit. If the key length s calculated in the key length calculation is larger than 28 Mbit, the generating unit 53 generates the cryptographic key having the outputtable size m.

FIG. 5 is a diagram of a second example of the block size and the outputtable size according to the embodiment. If the block size n decreases to 80 Mbit, for example, the outputtable size M can increase up to 48 Mbit. If the key length s calculated in the key length calculation is 48 Mbit, the generating unit 53 can output the whole key. The length s of the cryptographic key calculated in the key length calculation, however, decreases by the finite size effect of the block size n.

As illustrated in FIGS. 4 and 5, it is essential for an efficient calculation in the PA that the determining unit 52 determines the block size n considering the balance between the outputtable size m and the key length s.

Explanation of Advantageous Effects

Figure 6:
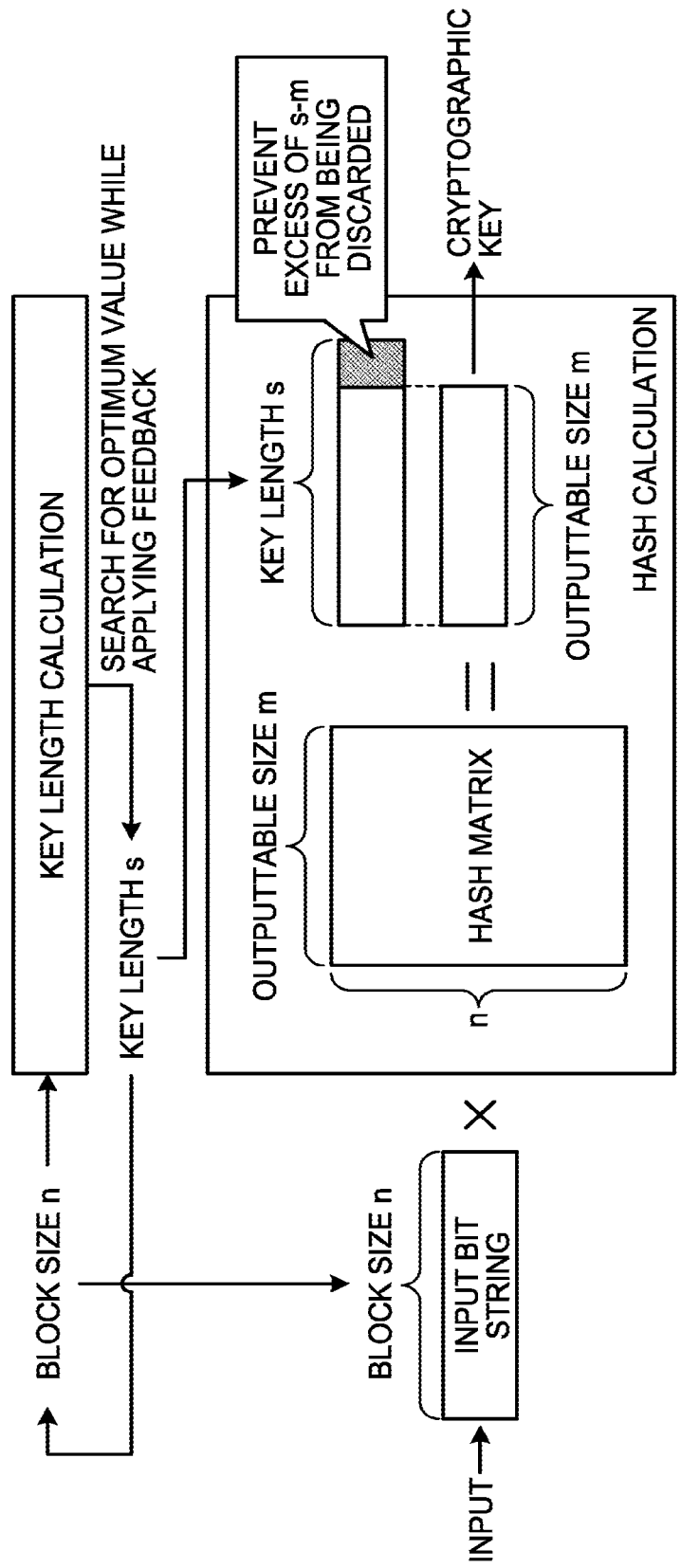
FIG. 6 is a diagram for explaining advantageous effects of a key generation device according to the embodiment.

FIG. 6 is a diagram for explaining advantageous effects of the key generation device 10 according to the embodiment. Conventional techniques use the fixed block size n of the hash matrix regardless of the key length s of the cryptographic key calculated in the key length calculation. However, if the processing size of the hash function (sum of the number of rows and the number of columns) is 128 Mbit, and the block size n is 100 Mbit as illustrated in FIG. 4, for example, the outputtable size m of the cryptographic key is determined to be equal to or smaller than 28 Mbit. If the key length s of the cryptographic key calculated in the key length calculation is 35 Mbit, an excess of 7 Mbit over 28 Mbit is discarded without being processed. As a result, the final secure key rate may possibly be reduced.

In the key generation device 10 according to the embodiment, the determining unit 52 determines and uses the optimum block size n from the key length s calculated in the key length calculation. The key generation device 10 thus can make the outputtable size m equal to the key length s of the cryptographic key calculated in the key length calculation. If the processing size of the hash function is 128 Mbit, and the block size n is 96 Mbit, for example, the outputtable size m of the cryptographic key is determined to be equal to or smaller than 32 Mbit. The key generation device 10 according to the embodiment determines that the key length s of the cryptographic key calculated in the key length calculation is 32 Mbit by applying feedback in advance or solving the equation of f(n)=m described above. As a result, if the block size n is 96 Mbit, the outputtable size m is determined to be 32 Mbit, and the key length s is also determined to be 32 Mbit. Consequently, the key generation device 10 can effectively use the resource of the key generation device and have no key bit string discarded without being processed. In the example illustrated in FIG. 4, the conventional techniques have reduction in the processing speed caused by discarding of 7 Mbit, for example. The key generation device 10 according to the embodiment does not discard the excess and can output the cryptographic key bit string of 32 Mbit, thereby increasing the processing speed.

As described above, in the key generation device 10 according to the embodiment, the calculating unit 51 calculates the key length s. The determining unit 52 determines the block size n corresponding to the unit of processing in the key generation and the outputtable size m indicating the size of a key outputtable by the key generation. The generating unit 53 generates a key having the key length s by a hash operation using a matrix having the size determined by the block size n and the outputtable size m.

As described above, the key generation device 10 according to the embodiment can increase the generation speed while maintaining the security of the key under the limited resource. Specifically, the key generation device 10 according to the embodiment can use the optimum block size n with respect to the key length s calculated in the key length calculation considering the limitation in the size of the memory for storing the hash matrix. Consequently, the key generation device 10 can improve the secure key rate while maintaining the security.

In the conventional techniques, the block size is fixed. If the finally calculated key length s of the cryptographic key exceeds the outputtable size m derived from the block size n, the actually output key has not the key length s but the outputtable size m, and part of the key is discarded. By contrast, the key generation device 10 according to the embodiment uses the optimum block size n. As a result, the outputtable size m derived from the block size n is extremely close to the key length s calculated by the calculating unit 51, thereby preventing part of the key from being discarded. Consequently, the key generation device 10 can provide the highest secure key rate under limitations due to the resource.

Finally, an example of the hardware configuration of the key generation device 10 according to the embodiment is described below.

Example of the Hardware Configuration

Figure 7:
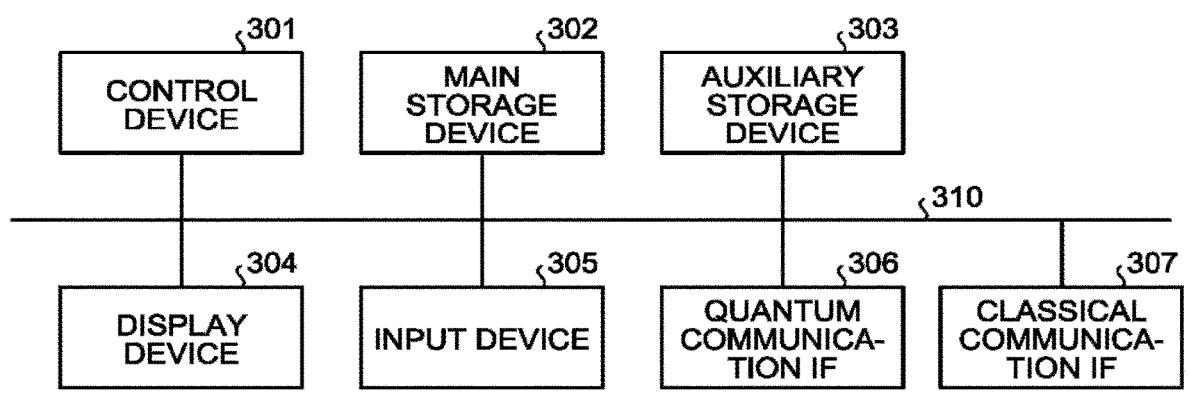
FIG. 7 is a diagram of an example of the hardware configuration of the key generation device according to the embodiment.

FIG. 7 is a diagram of an example of the hardware configuration of the key generation device 10 according to the embodiment. The key generation device 10 according to the embodiment includes a control device 301, a main storage device 302, an auxiliary storage device 303, a display device 304, an input device 305, a quantum communication interface (IF) 306, and a classical communication IF 307.

The control device 301, the main storage device 302, the auxiliary storage device 303, the display device 304, the input device 305, the quantum communication IF 306, and the classical communication IF 307 are connected via a bus 310.

The control device 301 executes a computer program read from the auxiliary storage device 303 to the main storage device 302. The main storage device 302 is a memory, such as a read only memory (ROM) and a random access memory (RAM). The auxiliary storage device 303 is a hard disk drive (HDD), a memory card, or the like.

The display device 304 displays the state of the key generation device 10, for example. The input device 305 receives an input from a user.

The quantum communication IF 306 is an interface for connecting the key generation device 10 to the quantum channel. The classical communication IF 307 is an interface for connecting the key generation device 10 to the classical channel.

The computer program executed by the key generation device 10 according to the embodiment is recorded in a computer-readable storage medium, such as a compact disc read only memory (CD-ROM), a memory card, a compact disc recordable (CD-R), and a digital versatile disc (DVD), as an installable or executable file and provided as a computer program product.

The computer program executed by the key generation device 10 according to the embodiment may be stored in a computer connected to a network, such as the Internet, and provided by being downloaded via the network.

The computer program executed by the key generation device 10 according to the embodiment may be provided via a network, such as the Internet, without being downloaded.

The computer program executed by the key generation device 10 according to the embodiment may be embedded and provided in a ROM, for example.

The computer program executed by the key generation device 10 according to the embodiment has a module configuration including functions capable of being implemented by the computer program out of the functional components of the key generation device 10 according to the embodiment.

The functions implemented by the computer program are loaded into the main storage device 302 by the control device 301 reading and executing the computer program from the storage medium, such as the auxiliary storage device 303. In other words, the functions implemented by the computer program are generated on the main storage device 302.

Part or all of the functions of the key generation device 10 according to the embodiment may be provided by hardware, such as an integrated circuit (IC). The IC is a processor that performs dedicated processing, for example.

If the functions are implemented using a plurality of processors, the processors may each implement one of the functions or two or more of the functions.

The operating form of the key generation device 10 according to the embodiment may be any desired form. The key generation device 10 according to the embodiment may be operated as a device included in a cloud system on a network, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A key generation device comprising:
a memory; and
one or more hardware processors coupled to the memory and configured to function as:
a calculating unit configured to calculate a key length;
a determining unit configured to determine a block size corresponding to a unit of processing in key generation based on at least one of a resource of the key generation device, an error rate of a channel, and statistical information on a pulse received via the channel, and an outputtable size indicating size of a key outputtable by the key generation; and a generating unit configured to generate a key having the key length by a hash operation using an input bit string and a matrix having a size determined by the block size and the outputtable size, the input bit string having the block size.

2. The device according to claim 1, wherein the determining unit determines the block size and determines the outputtable size based on the resource of the key generation device and the block size.

3. The device according to claim 1, wherein the determining unit determines the outputtable size and determines the block size based on the resource of the key generation device and the outputtable size.

4. The device according to claim 3, wherein the determining unit determines the block size such that the outputtable size is equal to the key length.

5. The device according to claim 3, wherein the determining unit receives feedback of the key length at predetermined time intervals, compares the fed-back key length and the outputtable size, and determines the block size such that the outputtable size is equal to the key length.

6. The device according to claim 3, wherein the determining unit receives feedback of the key length every time the key length is calculated, compares the fed-back key length and the outputtable size, and dynamically determines the block size such that the outputtable size is equal to the key length.

7. The device according to claim 3, wherein the determining unit collects histories of the key length and determines the block size such that the outputtable size is larger than an average or a maximum value of the key length.

8. The device according to claim 3, wherein the determining unit monitors the key length and the outputtable size obtained when the key length is calculated at predetermined time intervals and determines the block size such that the key length approaches the outputtable size.

9. A key generation method for a key generation device comprising:

calculating a key length;

determining a block size corresponding to a unit of processing in key generation based on at least one of a resource of the key generation device, an error rate of a channel, and statistical information on a pulse received via the channel, and an outputtable size indicating size of a key outputtable by the key generation; and generating a key having the key length by a hash operation using an input bit string and a matrix having a size determined by the block size and the outputtable size, the input bit string having the block size.

10. A computer program product for a key generation device having a non-transitory computer readable medium including programmed instructions, the instructions, when executed by a computer, causing the computer to function as:

a calculating unit configured to calculate a key length;

a determining unit configured to determine a block size corresponding to a unit of processing in key generation based on at least one of a resource of the key generation device, an error rate of a channel, and statistical information on a pulse received via the channel, and an outputtable size indicating size of a key outputtable by the key generation; and a generating unit configured to generate a key having the key length by a hash operation using an input bit string and a matrix having a size determined by the block size and the outputtable size, the input bit string having the block size.

* * * * *